United States Patent [19]

Rudin

[11] Patent Number: 4,624,853

[45] Date of Patent: Nov. 25, 1986

[54] INSTANT YOGURT FOOD PRODUCT

[75] Inventor: Richard E. Rudin, Kenosha County, Wis.

[73] Assignee: S. C. Johnson & Son, Inc., Racine, Wis.

[21] Appl. No.: 816,912

[22] Filed: Jan. 8, 1986

Related U.S. Application Data

[63] Continuation of Ser. No. 464,178, Feb. 7, 1983, abandoned.

[51] Int. Cl.$^4$ .......................... A23C 9/12; A23L 1/04
[52] U.S. Cl. ........................................ 426/61; 426/96; 426/583; 426/658; 426/661
[58] Field of Search ...................... 426/43, 61, 583, 98, 426/578, 96

[56] References Cited

U.S. PATENT DOCUMENTS

| | | |
|---|---|---|
| 2,045,019 | 6/1936 | Lorenzen . |
| 2,119,599 | 6/1938 | Nordsiek . |
| 2,406,585 | 8/1946 | Buchanan et al. . |
| 2,554,143 | 5/1951 | Hinz et al. ............................ 426/579 |
| 3,031,308 | 4/1962 | Campbell . |
| 3,080,236 | 3/1963 | Ferguson .............................. 426/61 |
| 3,231,391 | 1/1966 | Breivik et al. . |
| 3,295,986 | 1/1967 | Saslow et al. ......................... 426/98 |
| 3,326,696 | 6/1967 | Decnop . |
| 3,434,848 | 3/1969 | Katz . |
| 3,443,990 | 5/1969 | Decnop ................................. 127/33 |
| 3,471,301 | 10/1969 | Mitchell et al. . |
| 3,717,475 | 2/1973 | Germino et al. . |
| 3,721,571 | 3/1973 | Glicksman et al. . |
| 3,897,307 | 7/1975 | Porubcan et al. . |
| 3,917,875 | 11/1975 | Gardiner ............................... 426/41 |
| 3,932,680 | 1/1976 | Egli et al. ............................. 426/43 |
| 3,955,009 | 5/1976 | Eskritt et al. ......................... 426/578 |
| 4,066,792 | 1/1978 | Kanda et al. ...................... 426/583 X |
| 4,066,794 | 1/1978 | Schur ................................... 426/583 |
| 4,081,466 | 3/1978 | Haber .................................. 426/578 |
| 4,110,476 | 8/1978 | Rhodes ................................. 426/41 |
| 4,169,854 | 10/1979 | Igoe ..................................... 426/583 |
| 4,206,244 | 6/1980 | Schenk ................................. 426/583 |
| 4,289,788 | 9/1981 | Cajigas ................................. 426/43 |
| 4,374,155 | 2/1983 | Igoe et al. ........................ 426/583 X |
| 4,376,126 | 3/1983 | Evers ............................... 426/583 X |

OTHER PUBLICATIONS

People Weekly Journal, "The World Has Waited Patiently and Now It's Here: Instant Yogurt", Jun. 11, 1979, p. 103.

Staley Industrial Products-Technical Data, TDS, No. 176, 965140, A. E. Staley Manufacturing Company, Decatur, IL., Nov., 1982.

Staley Industrial Products-Product Bulletin, PIB 153, 376040, A. E. Staley Manufacturing Company, Decatur, IL., Aug., 1980.

Journal of Dairy Science, vol. 9, No. 9, Sep. 1977, pp. 1394–1398, article entitled: "Instability of Lactobacillus Acidophilus in Yogurt", by S. E. Gilliland and M. L. Speck.

*Primary Examiner*—Robert Yoncoskie

[57] ABSTRACT

An instant yogurt-like food product which can be easily and readily reconstituted by simple shaking and which is ready for consumption within two minutes and does not require refrigeration in its preparation, comprises at least one yogurt producing bacteria, a viscosity control agent, an encapsulated starch agent, edible acid, sweetener, dry edible oil, flavoring agent and salt.

6 Claims, No Drawings

INSTANT YOGURT FOOD PRODUCT

This is a continuation of co-pending application Ser. No. 464,178 filed on Feb. 7, 1983, now abandoned.

BACKGROUND OF THE INVENTION

This invention relates to an instant yogurt preparation which can be reconstituted using a liquid such as water or milk plus simple hand mixing. More particularly, this invention relates to an instant yogurt product which gives a product having smooth, yogurt-like texture and flavor.

Yogurt is a form of fermented milk which has been curdled to give a smooth, creamy or custard-like consistency. Natural yogurt is produced by implanting a beneficial mixture of *Streptococcus thermophilus* and *Lactobacillus bulgaricus* in milk allowing the micro-organisms to incubate until the proper acidity level is established in the milk. This mixture is then chilled to reduce the activity of the cultures and to control its final acidity. Because natural yogurt is an active mixture containing active micro-organisms, it must be chilled to prevent further incubation which will spoil the product. For this reason yogurt containing active cultures can be quite costly and must be consumed shortly after production and prior to its expiration date.

The texture of yogurt is also an important factor in determining its acceptability. The yogurt should be free of lumps and curds and should exhibit a smooth, custard-like, creamy consistency. There have been numerous attempts to prepare dried products which can be reconstituted to form an acceptable yogurt, i.e., so-called instant yogurt.

Prior attempts to produce such products are described in a number of patents such as U.S. Pat. No. 4,066,794 which describes an instant yogurt preparation. The product described in this patent is a sodium alginate gel or pudding containing a spray dried yogurt powder.

U.S. Pat. No. 3,955,009 is directed to a dried dessert mix composition which essentially is a pudding-like product which requires an electric mixture to be properly prepared. U.S. Pat. Nos. 4,289,788 and 4,289,789 are directed to instant yogurt compositions or drinks and require storage for an extensive time period, i.e. four or more hours, in order to form the desired consistency.

U.S. Pat. No. 4,081,566 is directed to a dried dessert mix composition which produces a product which is not smooth, creamy or does not have typical yogurt texture. Furthermore, it requires substantial effort in order to reconstitute the product including the mixing with mechanical mixing means followed by refrigeration for at least 10 minutes.

U.S. Pat. No. 3,917,875 is directed to a dessert composition which is more like an instant pudding than yogurt. Furthermore, it requires that the product be consumed within a relatively short period of time since the product continues to set into a rather stiff, starchy mixture. U.S. Pat. No. 3,955,009 describes a yogurt-like dessert. In effect, this product is a sweet and sour starch pudding.

A BRIEF DESCRIPTION AND OBJECTS OF THE INVENTION

It is therefore surprisingly found that an instant yogurt composition can be prepared which can readily be reconstituted by mixing with a liquid such as milk or water comprising from about 0.005 to 10% by weight of at least one yogurt producing bacteria; from about 0.5 to 20% by weight of a viscosity control agent; from about 4 to 60% by weight of a starch gelling agent; sufficient acid to produce a pH of from about 3.7 to 4.7; from about 10 to 90% by weight of a sweetener; from about 0.5 to 16% by weight of a dry, edible oil; from about 0.1 to 25% by weight of a flavoring agent; and from about 0.1 to 3% by weight of a salt.

It is therefore the primary object of the present invention to provide a composition which quickly and easily can be added to a liquid such as milk or water to form an instant yogurt product.

It is still a further object of the present invention to provide a product which can be reconstituted into a yogurt product with a minimum of agitation such as shaking or hand mixing.

It is still a further object of the present invention to provide an instant yogurt product which has the taste and mouth feel characteristics of yogurt produced from conventional processes.

It is a still further object of the present invention to provide a yogurt drink composition which can be quickly and easily prepared from a dry mix.

Still further objects and advantages of the composition to the present invention will become more apparent from the following more detailed description thereof.

DETAILED DESCRIPTION OF THE INVENTION

The instant yogurt food product of the present invention which is readily reconstituted by mixing with a liquid comprises from about 0.005 to 10% by weight of at least one yogurt producing bacteria; from about 0.5 to 20% by weight of a viscosity control agent; from about 4 to 60% by weight of a starch gelling agent; sufficient edible acid to produce a pH of from about 3.7 to 4.7; from about 10 to 90% by weight of a sweetener; from about 0.5 to 16% by weight of a dry edible oil; from about 0.1 to 25% by weight of a flavoring agent; and from about 0.1 to 3% by weight of a salt.

The compositions of the present invention include at least one yogurt producing bacteria. These yogurt producing bacterias are selected from yogurt cultures which contain *Lactobacillus bulgaricus* and *Streptococcus thermophilus* and *Lactobacillus acidophilus* as well as other yogurt cultures and mixtures. These bacterias in yogurt cultures are available as dry cultures. These dry cultures are produced by the process described in U.S. Pat. No. 3,897,307, and can be either used in a spray-dry, freeze-dried, or encapsulated form. Suitable bacteria include *Lactobacillus acidophilus* and dry cultures which contains a typical bacteria used in making natural fermented yogurt; i.e. *Lactobacillus bulgaricus*, and *Streptococcus thermophilus*.

To obtain sufficient live bacteria when ingested and to promote the growth of beneficial intestinal bacteria similar to that produced by natural yogurts, bacteria counts from about $1 \times 10^5$ to about $1 \times 10^9$ microorganisms per typical eight ounce servings should be used. The amount of culture may vary widely depending on its concentration and viability. Typically from about 0.005 to 10% by weight of dried culture is incorporated into the dry mix, preferably from about 0.1 to 5% and most preferably from about 0.15 to 1.0% dried material is used.

The second component in the composition of the present invention is a viscosity control agent. Suitably viscosity control agents include xanthen gums such as Keltrol or Keltrol-F produced by Kelco Corporation. Other gums such as guar gum, carrageenan, sodium alginates and locust bean gums are also suitable for use as viscosity control agents. This viscosity control agent is important to the composition of the present invention in that it reduces the amount of syneresis or weeping of the product once the initial gelled structure has been altered in any manner such as by spooning into the product.

The amount of viscosity control agent used in the product can vary widely depending on the other components present in the composition. Typical products will include from about 0.05 to 20% viscosity control agent while it is preferred that about 0.1 to 5% be present and optimally from about 0.2 to about 3% viscosity control agent be present.

The compositions of the present invention also include a starch gelling agent. The starch gelling agent is an important component of the composition of the present invention. By use of the appropriate starch gelling agents, the proper viscosity and mouth-feel of the composition when it has been reconstituted with liquid will occur. Suitable starches must be quick-setting, be rehydrated rapidly and have a generally bland flavor. Examples of suitable starches include a pregelatinized or modified starch or a coated pregelatinized starch, such as a coated pregelatinized starch as described in U.S. Pat. No. 4,575,395 titled "Coated Pregelatinized Starch and Process for Producing the Same" Ser. No. 677,335 filed Dec. 4, 1984 which is a continuation application of U.S. Ser. No. 464,179 filed Feb. 7, 1983, the disclosure of which is incorporated herein by reference as well as other similar starches; Nucol 4227 starch manufactured by A. E. Staley Co., a cold water swelling, corn-based starch which has been specifically modified to provide the functional convenience of a pregelatinized starch while furnishing the appearance and texture of a cook-up type starch. Use of these starches provide instant yogurt food products which can be rapidly reconstituted with liquid by simple mixing such as shaking or stirring.

Although the use of the Nucol starch or the coated pregelatinized starches is preferred, it is possible that other starches can be incorporated in the compositions of the present invention. However, if these starches are used, mechanical mixing may be necessary to obtain a smooth yogurt-like consistency. Starches of this variety include the pregelatinized tapioca starches such as Starco 447 available from A. E. Staley, PO-8 and H-50 produced by National Starch and Chemical Co. and other similar starches.

Depending on the other components present in the composition of the present invention in the amount of starch gelling agent will vary widely. Generally, however, from about 4 to 60% by weight of the starch should be present in the dry product while it is preferable to use from about 5 to 30% by weight starch and optimally from about 10 to 25% starch.

The composition of the present invention also includes sufficient edible acid to produce pH control. Suitable acids include citric acid, malic acid, whey acids, lactic acids, etc., and mixtures. The preferred acids are the malic and citric acids although other acids may be used. These acids provide the tart, tangy taste typical of yogurt and should be used in amounts sufficient to lower the pH to in the range from about 3.7 to 4.7 to give the typical acidic flavor of yogurt. Depending on the acids utilized and the other materials present in the composition, generally from about 2 to 30% and preferably from about 5 to 20% by weight of acid should be present in the dry composition.

The composition also includes a sufficient amount of a sweetener. Either natural and/or synthetic sweeteners can be utilized, such as sugars, fructose, aspartame, dextrose, lactose, etc. Also, artificial sweeteners can be utilized either in whole or in part as a sweetener such as sodium saccharin, etc. The preferred sweetener is a combination of sucrose and dextrose.

Typically, the amount of sweetener can vary widely; however, generally, from about 10 to 90% by weight sweetener and preferably from about 25 to 75% by weight and optimally from about 30 to 70% sweetener in incorporated.

The composition of the present invention also includes a dry edible oil. Generally, the oil component provides the product with the appropriate body and the creamy mouth-feel. These are characteristics of a natural fresh yogurt. Also, the addition of oil adds to the overall nutritional value of the dried yogurt product. Edible oils include those edible oils which are sprayed on dextrose or other suitable carriers. Such powdered vegetable oils include Beatreme 3458 produced by Beatrice Foods as well as other similar edible dried oils. The amount of powdered vegetable oil is typically from about 0.5 to 16% and preferably from about 1 to 4% by weight.

The compositions of the present invention also should include a flavoring agent. These flavoring agents include liquid, plated and spray dried yogurt flavors and fruit flavors. Although the yogurt food product of the present invention has many of the characteristics of yogurt, it does not have the identical taste characteristics of yogurt and accordingly flavoring agents simulating yogurt flavoring should be added. Also, it has been found that many people prefer yogurt having other flavorings such as berries, oranges, pineapple, and a wide variety of other fruits. Typically, these flavorings can be added in either liquid or dried form or in the form of vacuum dried, freeze dried, or puree dried starch fruit bits. Typical freeze dried fruit powders and bits are those supplied by Oregon Freeze Dried Foods or Pure-Aid fruit bits from National Starch. The amount of flavoring in the present composition can vary from about 0.1 to 25% by weight, preferably from about 0.3 to 15% by weight and optimally from about 0.5 to 3% by weight.

The compositions of the present invention also include a small amount of edible salt such as sodium chloride or potassium chloride. Generally from about 0.1 to 3% by weight of this edible salt should be present in the composition and preferably from about 0.1 to 1%. The salt is added in a small amount to enhance the overall flavor and acceptability of the yogurt product.

In addition to the above components, the compositions of the present invention include a wide variety of other materials. These materials include buffering agents, vitamins, minerals, artificial colorants, appetite suppressants, Lactose to help people who have difficulty digesting milk products, desicants in order to keep the powder free flowing, preservatives and the like. Generally these materials should be present in amounts less than 5% by weight of the total composition and should be used in amounts so as not to adversely affect the overall taste, appearance and acceptability of the final yogurt food product.

One additional optional ingredient which can be incorporated into the composition are dry milk-type materials. By the term "dry milk-type materials" is meant both dairy and non-dairy milk products and/or milk replacers. Examples of such dry milk-type materials include dried powdered milk, dried whey, dry non-dairy milk substitutes, etc. including mixtures. One embodiment of the products of the present invention are to be reconstituted by adding milk to the dried material to reconstitute the product. A second embodiment involves incorporating dry milk-type materials into the product so that the product can then be reconstituted using only water. Furthermore, some dry milk-type material can also be incorporated into the product which is designed to be reconstituted using milk so as to provide a creamier final yogurt product. Although not absolutely essential to the composition of the present invention it has been found appropriate to incorporate from about 1 to 80% by weight of dry milk-type material and typically from about 10 to 60% and optimally from about 15 to 50% to the dried product mix.

The compositions of the present invention can be prepared in a simple manner by essentially dry blending most of the components together. Where those materials to be added to the composition in the present invention are liquids, they should be sprayed or misted over the dry components during the blending process.

The compositions of the present invention should be packaged in sealed envelopes or pouches such that they will exclude air and moisture. Furthermore, the packages may also optimally be purged with nitrogen to exclude any oxygen so as to extend the culture shelf life at ordinary temperatures.

To use the compositions of the present invention, the appropriate amount of dried material can be placed into a dish or a cup and a suitable amount of liquid, either milk or water, is then added to the composition. The disk or cup may then be closed and the material shaken for about 10 to 20 seconds to provide a yogurt-like product. While not necessary, the product also may be combined using suitable mixing means. After the materials have been shaken together the product should be allowed to stand about 2 minutes to set up into its final consistency.

The product can then be consumed immediately or can be stored in the refrigerator in the same manner as storing natural yogurt.

The compositions of the present invention will now be illustrated by the following examples which are for the purpose of illustration only and are not in any way to be considered as limiting. In the following examples, all parts and percentages are by weight; and all temperatures are in degrees Celsius.

EXAMPLE I

The following formulation was prepared by dry blending the following ingredients:

| Ingredients | Percentage |
| --- | --- |
| Sucrose | 41.87 |
| Dextrose | 23.43 |
| Xanthan Gum | 0.41 |
| Citric Acid | 2.17 |
| Malic Acid | 5.35 |
| Sodium Citrate | 0.37 |
| Sodium Chloride | 0.67 |

-continued

| Ingredients | Percentage |
| --- | --- |
| Beatreme 3458[1] | 2.17 |
| Food Starch[2] | 20.87 |
| Yogurt Culture | 0.02 |
| *Lactobacillus acidophilus* culture | 0.15 |
| Yogurt Flavor | 0.61 |
| Fruit Flavor | 0.61 |
| Fruit Powder or Bits | 1.30 |
|  | 100.00% |

[1]Beatreme 3458 - A powdered vegetable oil available from Beatrice Foods
[2]Food Starch - a Pregelatinized tapioca starch coated with a 0.15% by weight coating of Myvatex TextureLite Emulsifier as described in U.S. Pat. No. 4,575,395 entitled "Coated Pregelatinized Starch and Process for Producing the Same"

When 23 gms of the above mix is mixed with 180 ml. of cold milk by hand shaking for 10 to 20 seconds followed by resting for 2 minutes, a yogurt product is produced which has good yogurt-like appearance and taste characteristics.

EXAMPLE II

A yogurt drink product is prepared having the following formulation:

| Ingredients | Percentage |
| --- | --- |
| Sucrose | 44.90 |
| Dextrose | 25.66 |
| Xanthan Gum | 0.45 |
| Citric Acid | 2.38 |
| Malic Acid | 5.86 |
| Sodium Citrate | 0.4 |
| Sodium Chloride | 0.73 |
| Beatreme 3458[1] | 2.38 |
| Food Starch[1] | 14.29 |
| Yogurt Culture | 0.02 |
| *Lactobacillus acidophilus* culture | 0.16 |
| Yogurt Flavor | 0.67 |
| Fruit Flavor | 0.67 |
| Fruit Powder or Bits | 1.43 |
|  | 100.00% |

[1]See Example 1

This formulation can be used to prepare a yogurt drink by mixing 21 gms. of the above dry mixture with 180 mls. of fresh, cold milk. After shaking for approximately 10 to 20 seconds, and allowing the mixture to rest for about 2 minutes, this product forms a creamy, yogurt tasting drink having suitable thickness but still thin enough to be drunk.

EXAMPLE III

An instant yogurt food product preparation is prepared by mixing the following ingredients such that water can be used in place of the fresh milk to reconstitute the product.

| Ingredients | Percentage |
| --- | --- |
| Sucrose | 22.94 |
| Dextrose | 12.83 |
| Xanthan Gum | 0.22 |
| Citric Acid | 1.19 |
| Malic Acid | 2.93 |
| Sodium Citrate | 0.20 |
| Sodium Chloride | 0.37 |
| Beatreme 3458[1] | 1.19 |
| Food Starch[1] | 11.43 |
| Yogurt Culture | 0.01 |
| *Lactobacillus acidophilus* culture | 0.08 |
| Yogurt Flavor | 0.33 |
| Fruit Flavor | 0.33 |
| Fruit Bits or Powder | 0.71 |

-continued

| Ingredients | Percentage |
| --- | --- |
| Instant Non Fat Dried Milk | 19.05 |
| Instant Whole Milk Powder | 26.19 |
| | 100.00% |

[1]See Example 1

The above dry mixture is then prepared into yogurt by mixing 42 gms. of the above mixture with 177 mls. of water. After shaking for approximately 10 to 20 seconds and allowing the product to rest for about 2 minutes, a product with the consistency and taste characteristics of yogurt is formed.

EXAMPLE IV

Yogurt pie filling having the following formulation is prepared by mixing the following ingredients together.

| Ingredients | Percentage |
| --- | --- |
| Sucrose | 39.89 |
| Dextrose | 22.03 |
| Xanthan Gum | 0.39 |
| Citric Acid | 2.07 |
| Malic Acid | 5.10 |
| Sodium Citrate | 0.36 |
| Sodium Chloride | 0.63 |
| Beatreme 3458[1] | 2.07 |
| Food Starch[1] | 24.90 |
| Yogurt Culture | 0.02 |
| Lactobacillus acidophilus culture | 0.14 |
| Yogurt Flavor | 0.58 |
| Fruit Flavor | 0.58 |
| Fruit Powder or Bits | 1.24 |
| | 100.00% |

[1]See Example 1

When 67 gms. of above dry mix is mixed with 500 mls. of fresh milk by simple hand mixing for 10 to 30 seconds and then placed into a pie crust shell, followed by refrigeration until the filling has reached desired firmness, a yogurt tasting pie filling having suitable thickness and consistency is produced.

EXAMPLE V

A further yogurt product having the following formulation is prepared.

| Ingredients | Percentage |
| --- | --- |
| Sucrose | 41.99 |
| Dextrose | 26.79 |
| Xanthan Gum | 0.41 |
| Citric Acid | 2.17 |
| Malic Acid | 5.35 |
| Sodium Citrate | 0.37 |
| Sodium Chloride | 0.67 |
| Beatreme 3458[1] | 2.17 |
| Nucol 4227 Starch[2] | 17.40 |
| Yogurt Culture | 0.02 |
| L. Acidophilus Culture | 0.146 |
| Yogurt Flavor | 0.60 |
| Fruit Flavor | 0.608 |
| Fruit Bits or Powder | 1.30 |
| | 100.00% |

[1]See Example 1
[2]Nucol 4227 Starch - Available from A. E. Staley

The above formulation is formed into yogurt by mixing 23 gms. of the above mixture with 180 mls. of fresh milk. After shaking for approximately 10 to 20 seconds and allowing the mixture to stand for 2 minutes, a yogurt product is prepared having the taste and mouth sensations similar to natural yogurt.

EXAMPLE VI

Formulation is prepared as set forth below.

| Ingredients | Percentage |
| --- | --- |
| Sucrose | 45.00 |
| Dextrose | 30.00 |
| Xanthan Gum | 0.45 |
| Citric Acid | 2.32 |
| Malic Acid | 5.50 |
| Sodium Citrate | 0.40 |
| Sodium Chloride | 0.75 |
| Beatreme 3458[1] | 2.50 |
| Nucol 4227 Starch[2] | 10.00 |
| Yogurt Culture | 0.025 |
| L. Acidophilus culture | 0.165 |
| Yogurt Flavor | 0.69 |
| Fruit Flavor | 0.70 |
| Fruit Bits or powder | 1.50 |
| | 100.00% |

[1]See Example 1
[2]See Example V

The above formulation forms a yogurt drink by mixing 20 gms. of the above mixture with 183 mls. of fresh milk. After shaking for 10 to 20 seconds, this product forms a creamy thick mixture suitable for consumption as a drink.

What I claim is:

1. A freeflowing dry food composition to be reconstituted into a yogurt-like product by mixing with liquid comprising from about 0.005 to 10% by weight of at least one yogurt producing bacteria; from about 0.5 to 20% by weight of a viscosity control agent selected from the group consisting of a gum or a mixture of gums; from about 4 to 60% by weight of a modified pregelatinized starch which is dispersible in liquids without agglomeration, said starch consisting essentially of from about 99.0 to 99.95% by weight of a pregelatinized starch selected from the group consisting of tapioca starch, corn starch, wheat starch, potato starch, rye starch and mixtures thereof, and from about 0.05 to 1.0% by weight of a food grade emulsifier selected from the group consisting of a mixture of distilled propylene glycol monoesters, distilled monoglycerides, and sodium stearoyl lactylate wherein the emulsifier substantially coats and encapsulates the starch to prevent agglomeration when added to liquids and to form a thin coating such that upon minimal agitation the starch is dispersed throughout a liquid medium to which it is added and thicken and set liquid medium, sufficient edible acid to produce a pH of from about 3.7 to 4.7; from about 10% to 90% by weight of a sweetener; from about 0.5 to 16% by weight of a powdered oil; from about 0.1 to 25% by weight of a flavoring agent; and from about 0.1 to 3% by weight of a salt.

2. The composition of claim 1 wherein the yogurt producing bacteria is selected from the group consisting of Lactobacillus bulgaricus; Streptococcus thermophilus, Lactobacillus acidophilus and mixtures thereof.

3. The composition of claim 1 wherein the acid is selected from the group consisting of citric acid, malic acid, whey acid, lactic acid and mixtures thereof.

4. The composition of claim 1 wherein the composition comprises from about 0.1 to 5% bacteria; from about 0.1 to about 5% viscosity control agent; from about 5 to 30% by weight encapsulated starch; from about 2 to 30% by weight acid; from about 25 to 75% by weight sweetener; from about 1 to 4% by weight powdered oil; from about 0.3 to 15% by weight flavoring agent; and from about 0.1 to 1% by weight salt.

5. The composition of claim 1 wherein the composition additionally includes from about 1 to 80% by weight of a dry material selected from the group consisting of dairy milk products, nondairy milk products, milk replacers and mixtures thereof.

6. The composition of claim 5 which includes from 10 to 60% by weight of said dry dairy milk products.

* * * * *